United States Patent
Fitzpatrick et al.

(10) Patent No.: US 6,222,375 B1
(45) Date of Patent: Apr. 24, 2001

(54) SYNCHRONOUS CALIBRATION TEST CIRCUIT FOR USE IN RECORDING SYSTEMS

(75) Inventors: James Fitzpatrick, Sudbury, MA (US); Christopher M. Carpenter, Sunnyvale, CA (US)

(73) Assignee: Quantum Corporation, Milpitas, CA (US)

(*) Notice: Subject to any disclaimer, the term of this patent is extended or adjusted under 35 U.S.C. 154(b) by 0 days.

(21) Appl. No.: 09/312,018

(22) Filed: May 14, 1999

(51) Int. Cl.[7] .......................... G01R 35/00; G11B 27/36
(52) U.S. Cl. .......................... 324/601; 360/31; 369/53
(58) Field of Search ........................ 324/601, 500, 324/537, 71.1, 76.13; 360/31; 369/53

(56) References Cited

U.S. PATENT DOCUMENTS

| | | | |
|---|---|---|---|
| 4,688,113 | * 8/1987 | Parsons | 360/31 |
| 5,130,866 | * 7/1992 | Klaassen et al. | 360/31 |
| 5,172,280 | * 12/1992 | Quintus et al. | 360/31 |
| 5,784,296 | 7/1998 | Baker et al. | 364/551.01 |

\* cited by examiner

Primary Examiner—Glenn W. Brown
(74) Attorney, Agent, or Firm—Michael Zarrabian

(57) ABSTRACT

A synchronous calibration test circuit in accordance with the principles of this invention that uses a bandgap reference voltage of a PRML chip and a write clock synthesizer to generate an output reference calibration signal comprising a programmable frequency and whose amplitude is invariant with environmental conditions. This reference signal is injected at the input of a signal path of the PRML chip and measured after the PRML's A/D converter using the synchronous test calibration circuit of this invention. Since the programmable frequency reference signal is insensitive to voltage supply fluctuations as well as temperature and process variations this reference signal can be used to measure and characterize changes in the transfer function of the analog signal path of the PRML chip.

11 Claims, 1 Drawing Sheet

SYNCHRONOUS CALIBRATION TEST CIRCUIT FOR USE IN RECORDING SYSTEMS

FIELD OF INVENTION

Invention relates to calibration test circuits for recording system devices, and more particularly to calibration test circuits for detecting drive fly height that may indicate impending drive failure.

BACKGROUND OF INVENTION

Within disk drives, characterization circuits in the channel chip (i.e., PRML) are typically provided to measure head and media parametrics, thereby eliminating a need for external equipment such as an oscilloscope or a spectrum analyzer. Currently, these measurement circuits, such as the harmonic sensor circuit described in U.S. Pat. No. 5,784,296, obtain head/media measurements with all transfer functions of the calibration circuit locked in fixed, non-adaptive states. A particular application of the harmonic sensor is to measure changes in fly height of the playback head. Changes in fly height are important to disk drives (or tape drives) since these critical changes are indications of potential drive failure from such as unwanted contamination and sensitivity to atmospheric pressure, or sensitivity to mechanical parameters in the drive such as tape tension in a tape drive. However, a limitation of the harmonic sensor is that changes in the transfer function characteristics of the channel chip (such as, i.e., a PRML chip) due to environmental factors can be mistaken for changes in a head or media parameter, thereby corrupting the measurements sensed by the harmonic sensor. Specifically, environmental variations such as temperature, or supply voltage can change the gain of the transfer functions in the front end of a channel chip. These changes in circuit characteristics are not distinguishable from changes in the head/media interface in current measurements by the harmonic sensor.

An additional drawback of the harmonic sensor technology described in U.S. Pat. No. 5,784,296 is that the by holding the transfer function of the drive in a static mode (i.e. not allowing the chip to adapt to its environment), the detector's performance can be degraded by changes in the signal. Thus, for example, if the user wishes to perform a test such as measuring changes in fly height versus atmospheric pressure, the equalization of the incoming signal should be identical to that used when the test is started. Because the playback signal changes with atmospheric pressure, the equalization should correspondingly change to compensate for the new signal. However, the transfer functions are locked in non-adaptive state during head/media parametric measurements, thus resulting in misequalization and increased error rate. The increased error rate can limit the range over which the harmonic sensor can be used.

There is therefore a need to measure variations in head/media parameters, and distinguish those measurements from environmentally sensitive transfer function characteristics so to more accurately acquire measurements necessary for measuring fly height, conducive for detecting drive failure before data lost.

SUMMARY OF INVENTION

A synchronous calibration test circuit is provided in accordance with the principles of this invention that uses a bandgap reference voltage of a PRML chip to generate as output a programmable frequency reference signal whose amplitude is invariant with environmental conditions. A bandgap referenced signal is injected at the input of a signal path of the PRML chip and measured after the PRML's A/D converter using the synchronous test calibration circuit of this invention. Since the bandgap referenced signal is insensitive to voltage supply fluctuations as well as temperature and process variations this reference signal can be used to measure and characterize changes in the transfer function of the analog signal path in the PRML chip, unhampered by the environmental sensitivities of the circuits that comprise transfer function of the analog portion of the chip. Any variation measured in the referenced signal at the output of the PRML filter or gain stages is attributable to the changes in the transfer characteristics of the filter or the gain stage.

Thus, the calibration circuit of this invention allows calibration of analog and digital signal processing blocks so that absolute, rather than relative head/media measurements can be made. In one example, the calibration circuit enables the harmonic sensor to measure absolute changes in fly height over the life of a drive.

DETAILED DESCRIPTION OF PREFERRED EMBODIMENT(S)

Figure 1:
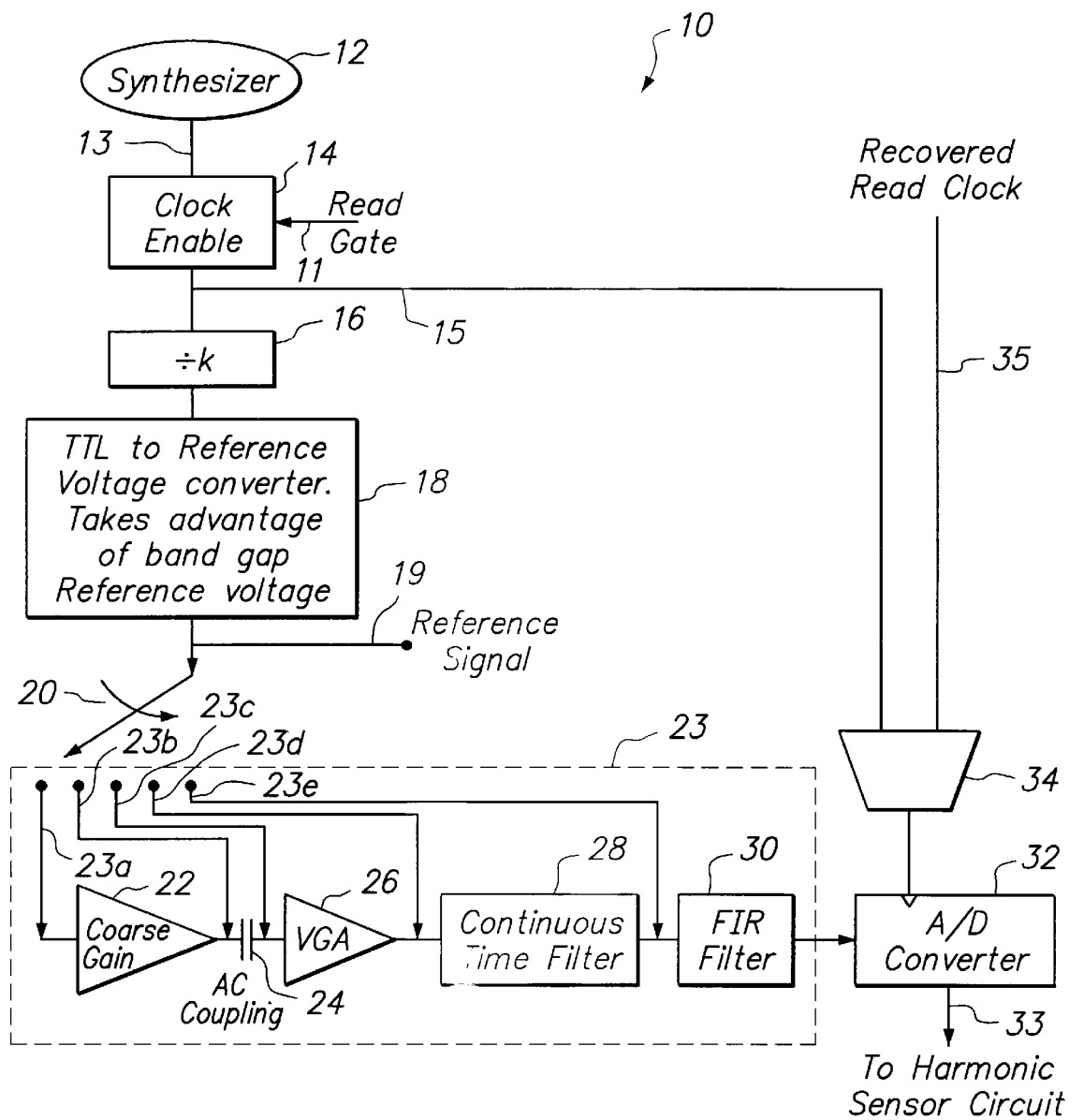
FIG. 1 illustrates a circuit schematic of the synchronous calibration test circuit provided in accordance with the principles of this invention.

FIG. 1 illustrates a synchronous calibration test circuit 10 provided in accordance with the principles of this invention. In the preferred embodiment, synchronous calibration test circuit 10 is integrated in a PRML channel chip (not shown) of the disk drive, with a write synthesizer 12 of the channel chip used to generate a digital signal 13 at a channel chip clock rate. Preferably, as will be described in this embodiment, digital signal 13 comprises a square wave, although triangular wave, or sine wave signal are also contemplated as possible alternatives. Square wave signal 13 is then passed through an amplifier 18 that reproduces the input square wave signal, but with an amplitude referenced to the bandgap voltage of the channel chip. Square wave signal 13 is gated on and off using a read gate 14. A frequency divider 16 comprising a divide by k circuit coupled between read gate 14 and amplifier 18 is provided to reduce the frequency of signal 13. Thus, if k=2, 4, 8, or 16, for example, a simple set of flip flops can be used to perform the division. At the output of amplifier 18, a resulting bandgap referenced signal 19 is thereby provided having an amplitude that is referenced to the chip's bandgap voltage, a fixed, environmentally insensitive voltage.

The conversion from a digital level signal to a square wave with a precise amplitude is a critical step and must be done with a circuit design that is independent of the supply voltage. Ideally, digital bandgap referenced signal 19 is injected via a switch 20, such as a multiplexer, at any one of several nodes (i.e., 23a, 23b, 23c, 23d, or 23e) in an analog path 23 of the channel chip. Preferably, analog path 23 comprises a coarse gain stage 22 the output of which is coupled to node 23b that is also connected to the input of an AC coupling capacitor 24 to remove DC offset from the signal path. The output of AC coupling capacitor 24 is in turn coupled to node 23c, also connected to the input of a voltage gain amplifier (VGA) 26. VGA 26 comprises an adaptive amplifier for amplifying the resulting signal from capacitor 24. The output of VGA 26 is then coupled to node 23d that is also coupled in turn to an input of a continuous time filter (CTF) 28. CTF 28 removes excess noise and operates in essence as an antialiasing filter. The output of CTF 28 is then coupled to node 23e that is in turn also coupled to an input of FIR filter 30. It is also envisioned, that in some PRML chips, the FIR filter is placed after the A/D converter.

FIR filter 30 comprises an adaptive filter to maintain a desired constant pulse shape at its output. The output of FIR filter 30 is then coupled to an input of A/D converter 32, with resulting output calibration reference signal 33 of A/D converter 32. Output calibration reference signal 33 can then be used as a signal input to a harmonic sensor circuit (not shown) during calibration to measure the fluctuations in the transfer function of the analog portion of the PRML chip due to environmental changes. Since variations in this programmable frequency reference signal 33 are attributable to changes in the transfer function of the PRML filter and gain stages, calibration reference signal 33 can thus be used to measure and characterize changes in the transfer function of analog signal path 23 in the PRML chip, and thus separate from the environmental sensitivities of the channel chip filters.

Additionally, different frequencies created by the divider circuit (or the synthesizer) allow the user to characterize changes in the gain of the analog transfer function at different frequencies. Moreover, the steep antialiasing roll off of the CTF minimizes harmonic contamination due to folding of the square wave's spectrum.

During calibration, the nominal input signal to the channel chip is disabled from its normal input to the chip. Calibration signal 19 then passes through analog path 23 of the chip and is sampled by A/D converter 32. Digital samples provided by calibration reference signal 33 at output of A/D converter 32 are then provided to a typical harmonic sensor of the channel chip, such as described in U.S. Pat. No. 5,784,296, to detect an amplitude of the resulting output signal 33 at a particular frequency. Moreover, current implementations of the harmonic sensor provide that A/D output signal 33 signal be sampled in multiple passes with a known phase relationship between signal 33 and the harmonic sensor in each pass. In an alternative embodiment, the A/D clock can be selected from the recovered read clock through multiplexer 34.

Thus, the calibration circuit of this invention allows calibration of analog and digital signal processing blocks so that absolute, rather than relative head/media measurements can be made. In one example, the calibration circuit enables the harmonic sensor to measure absolute changes in fly height over the life of a drive. Accordingly, the current invention presents a circuit and method for distinguishing variations in the PRML filters and isolating these measurements from the head media parameters that one desires to measure. By including the ability to characterize filter VGA and other systemic variations in the channel chip, one can monitor the relative fly height of heads in the drive over the entire life time of the drive. Consequently, this invention provides selfregulating disk drives, to identify problem disk drives prior to data loss.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A synchronous calibration test circuit integrated on a disk drive system for generating an output reference calibration signal insensitive to environmentally generated filter characteristic fluctuations of one or more filters of the calibration test circuit comprising:

a synthesizer for generating a programmable frequency clock signal; and a bandgap amplitude controlled amplifier, the bandgap amplitude controlled amplifier coupled to the synthesizer to receive as an input the programmable frequency clock signal and generating as an output of said amplifier, a bandgap referenced signal having a voltage amplitude referenced to a bandgap voltage to measure how the bandgap referenced signal changes.

2. The synchronous calibration test circuit of claim 1 further comprising an analog signal path, the analog signal path coupled to receive as an input the bandgap referenced signal and manipulating said bandgap referenced signal to generate the output reference calibration signal to measure how the output reference calibration signal changes through the analog signal path.

3. The synchronous calibration test circuit of claim 2 wherein the analog signal path comprises a first input switch to switch the input bandgap referenced signal between one or more analog signal path nodes.

4. The synchronous calibration test circuit of claim 2 wherein the analog signal path comprises:

a gain control stage coupled to receive as an input the bandgap referenced signal and providing an output amplified bandgap referenced signal; and a low-pass filter coupled to receive as an input the output amplified bandgap referenced signal, and to generate as an output an antialiased reference signal having a pulse shape equivalent to a signal pulse with minimal energy in harmonics above one half the sampling rate of a Nyquist frequency of the synchronous calibration test circuit.

5. The synchronous calibration test circuit of claim 4 further comprising an analog-to-digital converter (A/D converter) coupled to the output of the low-pass filter to convert the output antialiased reference signal to a corresponding digital signal form.

6. The synchronous calibration test circuit of claim 1 wherein the disk drive system includes a channel chip, and wherein the bandgap voltage comprises a bandgap voltage of the channel chip.

7. A method of generating an output reference calibration signal insensitive to environmentally generated filter characteristic fluctuations of one or more filters of a synchronous calibration test circuit integrated on a channel chip comprising the steps of:

generating a programmable frequency clock signal;

providing the programmable frequency clock signal to a bandgap amplitude controlled amplifier; and generating as an output of the bandgap amplitude controlled amplifier, a bandgap referenced signal having a voltage amplitude referenced to a bandgap voltage.

8. The method of generating an output reference calibration signal of claim 7, further comprising the steps of:

providing an analog signal path including one or more nodes, for manipulating the bandgap referenced signal to generate the output reference calibration signal; and providing a switch to switch the bandgap referenced signal between one or more signal path nodes.

9. The method of generating an output reference calibration signal of claim 7 wherein the step of providing an analog signal path further comprises:

providing a coarse gain converter coupled to receive as an input the bandgap referenced signal and providing as an output an attenuated reference signal;

providing an AC coupling capacitor coupled to receive as an input the attenuated reference signal and providing as an output an attenuated reference signal with a DC offset;

providing a voltage gain amplifier coupled to receive as an input the attenuated reference signal with a DC offset and providing an output adaptive DC offset reference signal;

providing a continuous time filter coupled to receive the output adaptive DC offset reference signal and filtering out excess noise to generate as an output an antialiased DC offset reference signal;

providing a FIR filter coupled to receive as an input the antialiased DC offset reference signal, and to generate as an output a matched shaped reference signal having a pulse shape equivalent to a signal pulse shape of a programmable frequency reference signal generated by a synthesizer; and providing an analog-to-digital converter to receive as an input the matched shaped reference signal from the output of the FIR filter and generating the output reference calibration signal.

10. The method of generating an output reference calibration signal of claim 7 wherein the bandgap voltage comprises the bandgap voltage of the channel chip.

11. A synchronous calibration test circuit integrated on a channel chip for generating an output reference calibration signal for measuring parameters in head/media elements comprising:

a synthesizer for generating a programmable frequency clock signal;

a bandgap amplitude controlled amplifier, the bandgap amplitude controlled amplifier coupled to the synthesizer to receive as an input the programmable frequency clock signal and generating as an output of said amplifier, a bandgap referenced signal having a voltage amplitude referenced to a bandgap voltage of the channel chip; and an analog signal path, the analog signal path coupled to receive as an input the bandgap referenced signal and generating the output reference calibration signal, wherein the analog signal path further comprises:

a coarse gain converter coupled to receive as an input the bandgap referenced signal, and providing as an output an attenuated reference signal;

an AC coupling capacitor coupled to receive as an input the attenuated reference signal and providing as an output an attenuated reference signal with a DC offset;

a voltage gain amplifier coupled to receive as an input the attenuated reference signal with a DC offset and providing an output adaptive DC offset reference signal;

a continuous time filter coupled to receive the output adaptive DC offset reference signal and filtering out excess noise to generate as an output an antialiased DC offset reference signal;

a FIR filter coupled to receive as an input the antialiased DC offset reference signal, and to generate as an output a matched shaped reference signal; and an analog-to-digital converter (A/D converter) coupled to the output of the FIR filter to convert the matched shaped reference signal to the output reference calibration signal in a corresponding digital signal form.

* * * * *